Jan. 25, 1944.  B. PHILLIPS  2,340,273
TOW BAR
Filed July 10, 1943  2 Sheets-Sheet 1

INVENTOR.
Benjamin Phillips
BY Wood, Arey, Herron & Evans
Attorneys.

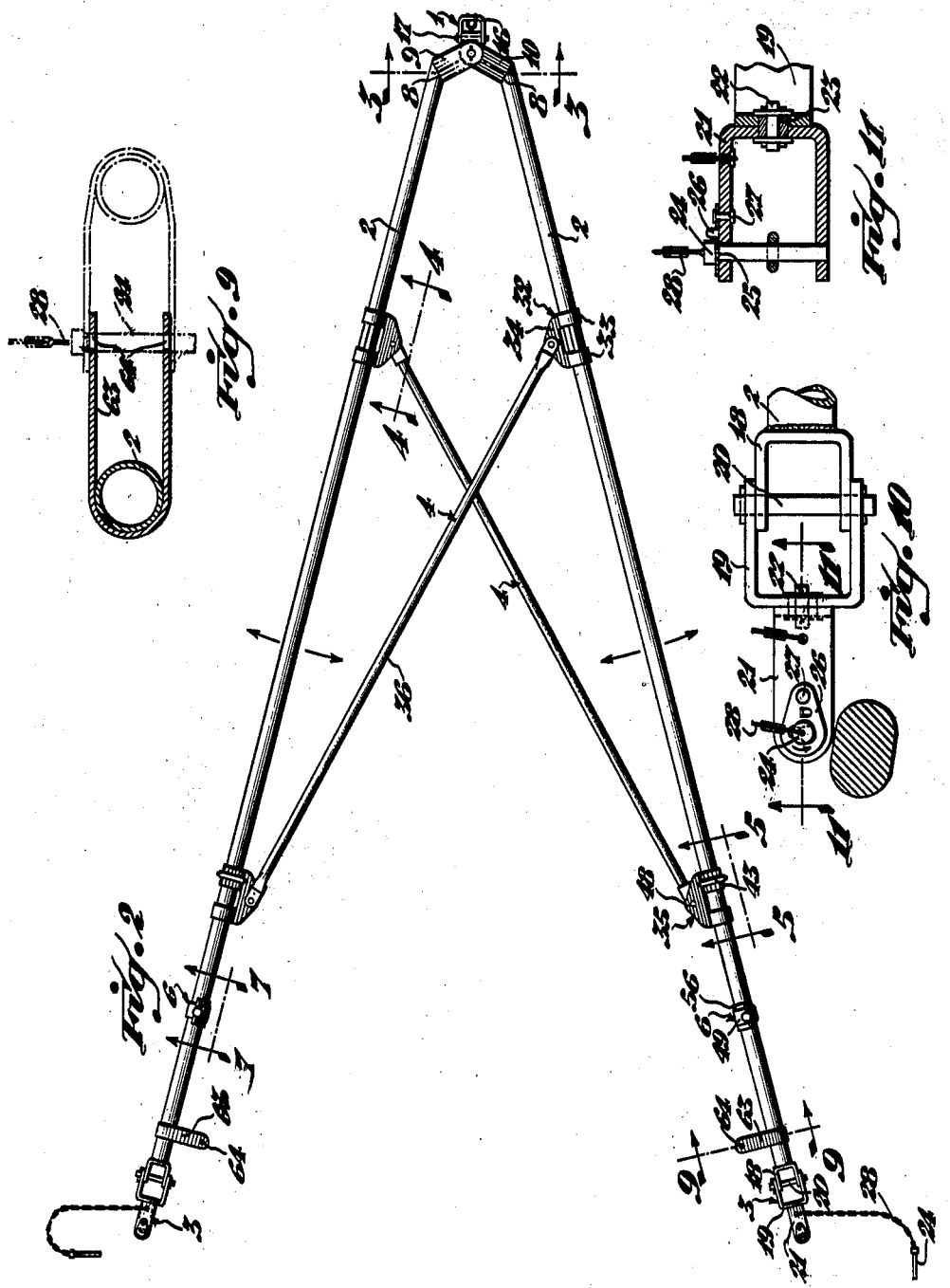

Patented Jan. 25, 1944

2,340,273

UNITED STATES PATENT OFFICE 2,340,273

TOW BAR

Benjamin Phillips, Cincinnati, Ohio, assignor to Phillips Pump and Tank Company, Cincinnati, Ohio, a corporation of Delaware Application July 10, 1943, Serial No. 494,190

10 Claims. (Cl. 280—33.14)

This invention relates to an adjustable tow bar apparatus which is used for towing airplanes by means of a suitable tractor or the like. The principal objective of the invention has been to provide the simplified tow bar structure having a hitch at its one end adapted for connection with the tractor and having means at its other end adapted for engagement with the airplane wheel struts.

Heretofore airplanes have been moved about the field and to and from the hangars either manually, by a crew of men detailed to that duty, or by means of tractor towed bars designed to suit specific types of airplanes. Such tow bars have been of rigid construction and have been substantially useless for moving airplanes of types other than the ones they are designed to fit. It has been necessary, therefore, that the landing field or hangars have available a variety of tow bar units of different kinds and sizes in order that the moving crew at the field might select the one required for each job. This procedure obviously is not only time consuming, but is still more undesirable for the reason that the field rarely can be equipped completely with moving apparatus suitable for all types of planes which call for service or repair. This is particularly true at emergency landing fields in war areas where a plane must be moved quickly from the field to conceal it from enemy aircraft.

With these various factors in mind the purpose of the present invention has been to provide a universal tow bar which is adjustable through an almost infinite variety of dimensions to fit the landing gear of any plane that must be moved.

A further objective of the present invention has been to provide a collapsible tow bar which, when not in use, may be compactly arranged in a small unit to facilitate the storage and the shipment of it.

A further objective of the present invention has been to provide a wheelable tow bar unit which, dragged at one end, may be rolled about with little effort. In this manner strength may be built into the apparatus through the use of relatively heavy structural members without inconveniencing its usage.

A still further objective of the present invention has been to provide a tow bar comprising towing leg members, interconnected through cross braces, which permit the legs to be spread apart freely and yet restrain closing or collapsing movement of the legs through uni-directional clutches arranged to be released by hand. These provisions enable the legs of the tow bar to be spread apart conveniently to the distance necessary to accommodate the particular plane which must be towed. Thereafter the clutches provide a gripping action which prevents the arms from moving together when the plane is being towed.

A still further objective of the present invention has been to provide a structure of this sort in which the cross braces distribute and equalize the load to which each of the towing legs is subjected, and also provide resistance against bending movements in these members.

The present invention also contemplates a tow bar in which the tractor hitch at the forward end of the unit is mounted for movement in compound directions so that the tow bar may be arranged at various angular positions between the plane and tractor to eliminate undue downward strain upon the tractor or the plane during towing movements.

A preferred embodiment of the tow bar in which these principles are utilized is shown in the accompanying drawings and, from the foregoing explanation and the following detailed description, those skilled in the art readily will comprehend the various modifications to which the invention is susceptible.

In the drawings:

Figure 2 is a plan view of the tow bar apparatus of the invention.

Figure 9 is a cross sectional view taken on the line 9—9 of Figure 2.

Figure 10 is an enlarged plan view showing the arrangement for shackling the ends of the tow bar arms to the airplane landing gear.

Figure 11 is a cross sectional elevation taken on the line 11—11 of Figure 10.

Figure 1:
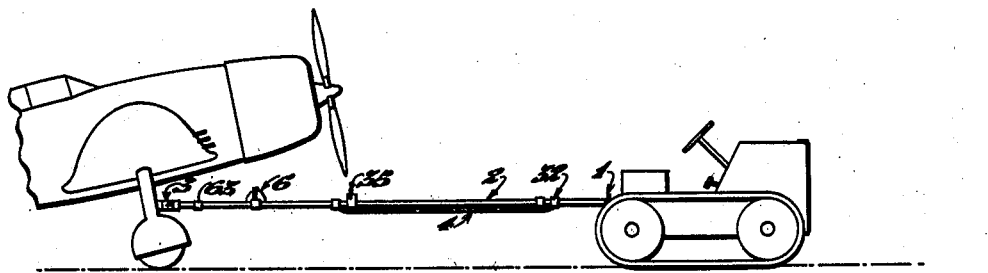
Figure 1 is a diagrammatic view showing the tow bar interconnecting a tractor or other towing vehicle with the landing gear of an airplane during usage of the apparatus.
Figure 3:
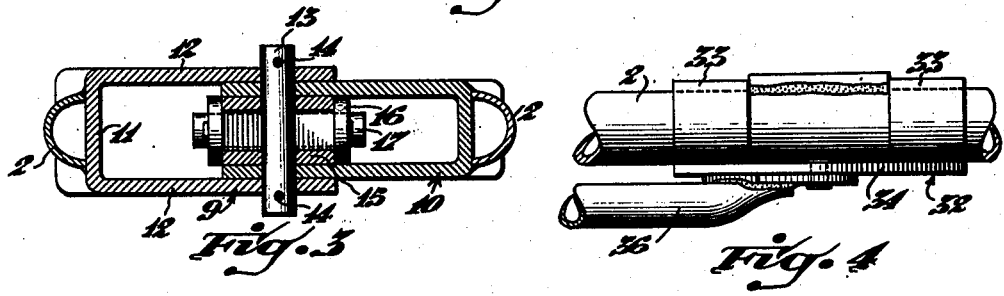
Figure 3 is a cross sectional view taken on the line 3—3 of Figure 2.
Figure 4:
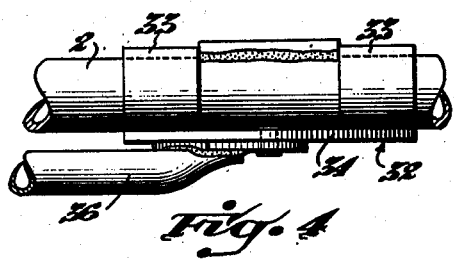
Figure 4 is an elevation taken along the lines 4—4 of Figure 2. This view shows the interconnection of a strut with the tow bar arm.

In the preferred embodiment shown in the drawings just described the towing units consist essentially of a hitch indicated generally at 1, having legs 2—2 pivotally connected to the hitch and diverging from it. These legs, at their opposite ends, carry the shackling structures 3 through which they are connected with the airplane landing gear. The legs are interconnected with one another and thereby braced by cross struts 4—4 while wheel units indicated generally at 6 depend from the arms to enable the unit to be rolled about to the point of usage.

The structure shown in the drawings is one which may be made conveniently from wrought iron pipe and metal plate which after fabrication may be assembled by welding. This considerably reduces the cost of the apparatus; no extensive machining of the parts is required.

The legs 2 are comprised of tubular sections which at the forward end of the apparatus are severed angularly as at 8. Clevis members 9 and 10 are welded to the respective angle faces 8. each of the clevis members comprises a back web 11 which is held to the angle surface and arms 12—12 extending outwardly therefrom at an angle with respect to the axis of the main legs 2. The arms 12 of the clevis 9 are spaced apart a distance greater than the arms of the clevis 10 whereby the latter fits into the former while a pivot pin 13 passes through both sets of arms to constitute the pivotal axis between the legs 2. The pivot pin is held in place by means of cotter pins 14.

A hitch block 15 is disposed between the arms 12 of the inner clevis 10. This block is traversed by the pivotal shaft 13 and extends forwardly from the apparatus to carry an eye member 16 which is pivotally mounted to the block in a plane substantially parallel with the plane of the arms through the pivot pin 17. Therefore, the eye member 16, which in a simple convenient form may be a strap having its arms connected to the pivot shaft 17, is free to move in an up and down direction and, at the same time, rotate horizontally about the shaft 13. The clevises 9 and 10 extending angularly from the legs 2 toward one another space the arms apart at their forward end to provide for compaction of the apparatus as described at a later point in the specification.

At the rearward ends of the legs 2 they are provided each with a fork piece 18 which, similarly to the clevises 9 and 10, pivotally carries a cooperating fork member 19 through a shaft 20. Connector brackets 21 of U-shape are rotatably mounted to the flat rearward faces of the forks 19 through the pivot pins 22. In the preferred structure these pins are journalled in bushings 23 which reside in suitable bores in the mating webs of the fork connector elements 19 and 21 respectively.

Thus each leg terminates in a bifurcated connector element which is rotatable about the axis of the leg through the pivotal connection furnished by the pin 22 and may also be swung through an arc, in vertical directions, through the pivotal mounting provided by shaft 20. This arrangement enables the point at which the connection is to be made to be altered to suit the conditions necessary for connection of the apparatus to a wide variety of airplane types.

For the actual connection, each connector fork 21 is traversed by a keeper 24 which, as shown in Figure 11, has an annular groove 25 at its upper end adjacent an enlarged head. A latch 26 is pivotally mounted on a side arm of the connector bracket through a pin 27 and the latch has communicating bores, one of which is sufficiently large to clear the head of the keeper while the other just fits the annular restricted groove. Therefore, by shifting the latch until the smaller bore thereof embraces the annular groove, the keeper 24 is held, positively, in position. The keeper pin is attached to the fork through a chain 28.

The connection of the apparatus with an airplane may be accomplished in various ways. If eye bolts are provided at the landing struts then the fork is adjusted to straddle the eye bolt and the keeper is passed through the fork and eye bolt to form the hitch. If no eye bolt is available the fork itself may straddle a portion of the strut or if it is too small for this purpose then the chain 28 may be passed around the strut after which the keeper pin is dropped in place.

At the forward ends of the legs brackets 32 are fastened to them. Each bracket comprises spaced apart tubular portions 33 embracing the leg and a connector plate 34 which extends laterally from the tubular portions 33 in offset relationship to the axis thereof. The offset connector plates are oppositely arranged upon legs 2, one at the top side of the legs and the other at the bottom.

Similar brackets 35 are provided on the legs at the rearward portions of the legs except that these are slidable upon the legs and are equipped with uni-directional clutches. Cross braces 36 interconnect the respective stationary bracket plates 34 with the slidable brackets 35. In view of the offsetting of the plate portions 34 of the brackets the cross struts clear one another yet reside substantially in the plane of the legs 2.

Each of the clutch brackets 35 comprises a clutch housing made up of side walls 37 which surround substantially one-half of the leg 2 and extend laterally therefrom, at the opposite side, for interconnection with one another through a cross web 38. Each of the arms has an aperture 39 therein providing a tapered or cam surface 40. The journals of a pressure roller 41 extend through the apertures while the roller itself is arcuately grooved at its central portion, as at 42, to approximate the contour of the leg. The cam surfaces 40, at the point thereof farthest removed from the leg, clears the journal of the roller and permits it to rotate freely while resting upon the leg. However, this surface converges toward the leg so that the clutch roller, moving freely along the leg 2, moves a distance sufficient for engagement of the upper portion of the roller journal with the tapered surface, thereby moving the roller axially into pressure engagement with the leg. This in turn causes the leg to be moved into frictional engagement with the arms which embrace it at the lower side, thus causing the bracket frictionally to grip the leg and be restrained against sliding movement. The cam surfaces 40 converge toward the leg in a direction forwardly of the apparatus, that is, toward the front or tractor hitch end.

Releasing handles 43 are provided at the clutch assemblies. Each of these comprises a U-shaped piece straddling the clutch housing and having its side arms 44 residing adjacent the side walls 37 thereof. The arms 44 are bored and screws 45 pass through them into threaded engagement with the pressure roller at its opposite ends while the upper portions of the side arms 44 of the handles are slotted longitudinally as at 46. A pin 47 fastened to the clutch housing extends laterally thereof through these slots 46 and acts therefore as an axle around which the assembly of the releasing handle and clutch roller may be tilted.

Figure 5:
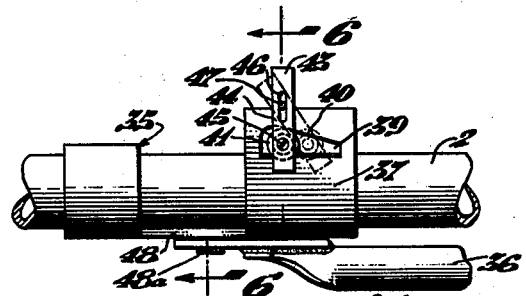
Figure 5 is a view taken along the lines 5—5 of Figure 2 and is similar to Figure 4 which shows the details of the cross brace clutch.
Figure 6:
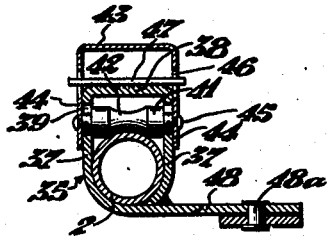
Figure 6 is a cross sectional view taken on the line 6—6 of Figure 5.
Figure 7:
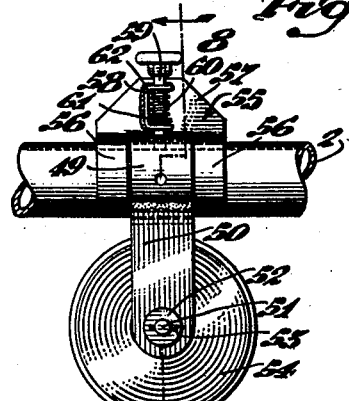
Figure 7 is an elevation showing wheel mounting details as taken on the line 7—7 of Figure 2.

When the roller advances to the forward end of the apertures 39 of the clutch housing the releasing handle therefor assumes the angular position as shown best in Figure 5. In this position the clutch is closed with the roller thereof pressing downwardly upon the leg 2 urging it into frictional engagement with the portions 37 of the clutch housing which embrace the roller part of the leg as shown in Figure 6. When the handle is gripped and tilted upward and forwardly so as to assume a more vertical position the roller is moved in a backward direction, its journals clear the cam surfaces of the apertures 39 and the roller therefore is relieved of its pressure engagement with the legs.

The clutch brackets, at any time, may be moved relatively in a rearward direction of the legs to permit them to be spread. Thus, if the clutch is closed, this movement frees it. On the other hand, during towing operations the rollers of the clutches, tracking upon the legs, advance downwardly upon the cam surfaces and effect the bind action just described.

Plate members 48 extending laterally from the clutch housings 35 at the lower portion thereof provide for pivotal connection of the cross braces 4 thereto as through the pivot pins 48a. In the preferred structure, as shown in Figure 6, the clutch is built from a single piece of metal which, from the plate 48, is bent upwardly to embrace about a quarter of the leg contour, then, at a point above the leg, the metal is bent over to form the top wall 38 and bent downwardly again with its lower portion embracing an opposite portion of the periphery of the leg to form the friction seat. This latter portion may be welded to the plate 48 as indicated, while the apertures 39 and the releasing handle for the clutch may be formed by suitable blanking and stamping operations. The pin 47 also may be fastened to the top wall of the clutch housing as by welding.

For the purpose of enabling the tow bar apparatus to be trundled from one point to another at the air field or the hanger, casters are provided as indicated generally at 6. In the preferred structure these units are located on the legs at the rearward portion thereof forwardly of the attachment apparatus. Each leg is provided with a collar 49 which is rotatable thereon and the legs 50—50 are held to this collar to reside in spaced parallel relationship to one another. These constitute a fork for the caster. The fork is bored transversely at its lower portion to receive an axle 51, with spacers 52 being located at the inner and outer faces of the legs respectively. Cotter pins 53 pass through the axle to hold it in place against the outer washers and a caster 54 is mounted on the axle so that it may rotate.

Figure 8:
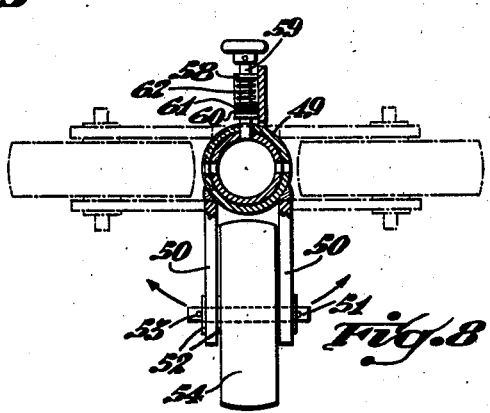
Figure 8 is a cross sectional view as taken on the line 8—8 of Figure 7.

For the purpose of adjustably supporting the caster unit, a bracket 55 is provided having portions 56 embracing and attached to the leg 2 at opposite ends of the collar 49 and a support member 57 which is bent up to extend laterally from the leg as shown in Figure 8. The support member 57 may be formed from the metal lying in-between the leg embracing portions 56. A U-shaped bracket 58 is fastened, flatwise, against the face of the plate 57 to provide upper and lower supporting ledges which are spaced apart from one another. These ledges are bored to receive a lock pin 59 which has a handle at its upper end. Intermediate the support ledges 58 a pin 60 is passed transversely through the lock pin to support a washer 61 and a compression spring 62, having its one end resting on the washer, surrounds the lock pin 59 with its upper end sustained against the bottom face of the upper ledge 58. This spring therefore urges the lock pin toward leg 2. Collar 49 is provided with radial bores located in spaced relationship in its periphery to receive the lock pin. One of these bores is entered by the lock pin 59 when the caster lies in a plane lateral to the plane of the legs 2 while bores at opposite sides thereof are employed to enable the caster to be held in right and left-hand horizontal positions as shown by the dotted lines, in which event they lie substantially flush with a plane passing between the leg. Through this arrangement the casters may be held in the lateral position when they are to be utilized and may be thrown off, to one side or the other, during towing operations or when they would otherwise interfere with usage of the apparatus.

In respect to the mounting of the casters the invention contemplates a structure in which the casters are supported at a slight outward camber whereby when the bar itself is being towed the cambering of the casters will cause them to move relatively toward one another and thereby move the legs into a position of substantially parallel alignment. Conversely, when the towing apparatus is lined up directly in front of an airplane which is to be towed the camber of the casters will cause the legs to slide automatically as the unit is backed up toward the plane. This to a great extent eliminates the necessity for two operators to complete attachment of the tow bar to the landing gear.

At the rearward end of each leg it is also provided with a strap 63; this is a U-shaped piece which fits around the legs and extends laterally therefrom in the plane of the legs and toward one another. One of the U-shaped pieces has its endwise portions arranged to fit between the endwise portion of the other and transverse bores 64 are provided to receive the keeper pin 24. Therefore, as the legs are brought together the strap 63 on the respective legs is brought into engagement and when the bores therein are aligned the keeper pin may be dropped through them to hold the legs in closed relationship. This is particularly desirable for shipping purposes so that the apparatus may be handled conveniently without danger of the legs being spread apart inadvertently.

It may be noted that the laterally offset leg portions 9 extend angularly toward one another from the forward ends of the legs 2 so that they are spaced apart from one another at this portion of the apparatus. At the other end the lateral extensions of the brackets 63 also hold the legs apart when they are in substantially parallel relationship. When the legs are arranged in this position the space between them accommodates the cross rods 36 so that the entire apparatus is substantially uniform in width throughout its length when closed and therefore readily adapted to be packed or stored in a minimum of space.

When the towing unit is to be used the keeper pin is removed from the strap 63 and the legs are spread apart a distance suitable for attachment of them to the landing gear of the airplane. Thereafter the clutches prevent closing movements of the legs until the clutches are manually released through operation of the handles 43.

Having described my invention, I claim:

1. A tow bar adapted to be used for towing airplanes by means of a tractor or the like, comprising a hitch adapted for attachment to a towing vehicle, leg members pivotally interconnected with one another at the said hitch member, means at the opposite ends of the leg members for effecting attachment thereof with the landing gear of an airplane, strut members pivotally extending from each tow bar to the other in crossed relationship to one another and unidirectional clutches interconnecting the free ends of said strut members with said legs whereby said legs may be spread apart from one another and restrained against movement toward one another through said clutch members.

2. A tow bar for towing airplanes from a tractor vehicle, comprising leg members, means extending laterally from each leg member into pivotal connection with corresponding means extending from the other leg whereby the legs are hinged to one another, means at the opposite ends of said leg members for effecting connection thereof of the landing gear of an airplane, strut members each having one of the ends thereof pivotally connected to a leg member respectively, clutch devices embracing said legs and pivotally connected to the opposite ends of said strut members whereby said struts are arranged in cross relationship, said clutch devices being longitudinally movable upon said legs in a direction appropriate to permit said legs to be spread apart from one another, and means carried by said clutch devices for exerting a binding action upon said legs to restrain relative movement of said clutch devices on said legs in an opposite direction corresponding with the closing movement of said legs.

3. A tow bar for towing airplanes from a tractor vehicle, comprising leg members, means extending laterally from each leg member into pivotal connection with corresponding means extending from the other leg whereby the legs are hinged to one another in spaced relationship, means at the opposite ends of said leg members for effecting connection thereof of the landing gear of an airplane, strut members, each having one of the ends thereof pivotally connected to a leg member, friction clutch devices embracing said legs and pivotally connected to the opposite ends of said strut members whereby said struts are arranged in crossed relationship, said clutch devices being longitudinally movable upon said legs in a direction appropriate to permit said legs to be spread apart from one another, means carried by said clutch devices for exerting a binding action to restrain relative movement of said clutch device on said legs in an opposite direction corresponding with the closing movement of said legs, and manually operated means for releasing said clutch devices.

4. A tow bar for towing airplanes from a tractor vehicle, comprising leg members, means extending laterally from each leg member into pivotal connection with corresponding means extending from the other leg member whereby the said legs are hinged to one another in spaced apart relationship, means at the opposite ends of said leg members for effecting connection thereof of the landing gear of an airplane, strut members, each having one of its ends thereof pivotally connected to a leg member and diverging therefrom angularly, friction clutch devices embracing said legs and pivotally connected to the opposite ends of said strut members whereby said struts are arranged in crossed relationship, said clutch devices being longitudinally movable upon said legs in a direction appropriate to permit said legs to be spread apart from one another, means carried by said clutch devices for exerting a frictional binding action to restrain relative movement of said clutch devices on said legs in an opposite direction corresponding with the closing movement of said legs, and manually operated means for releasing said clutch devices whereby said legs may be arranged to reside in parallel relationship with one another and spaced apart through said laterally extending pivot means, with the said cross struts residing in the space between said legs.

5. A universal tow bar arranged for attachment to the landing gear of different types of airplanes for enabling said airplanes to be towed by a tractor vehicle, comprising a hitch member, legs pivotally interconnected with said hitch member, means at the opposite ends of said leg members for effecting attachment thereof to the landing gear of an airplane, cross braces each having one endwise portion thereof pivotally connected with a respective leg of the pair adjacent its forward end, clutch members respectively longitudinally movable upon said legs adjacent their rearward end and having portions thereof embracing the legs for frictional engagement therewith, pressure rollers carried in said clutches for engaging the surfaces of said legs to effect the binding action at said frictional surfaces, and means providing cam surfaces arranged for engagement with said pressure rollers to urge said pressure rollers against said leg surfaces and thereby effecting engagement of said frictional surfaces when the clutch members are moved longitudinally upon the legs in one direction to restrain said legs against collapse during towing.

6. A tow bar for towing airplanes from a towing vehicle such as a tractor, comprising leg members pivotally interconnected with one another at one end thereof, means for connecting the opposite ends of said legs with the landing gear of an airplane, a hitch member interconnected with said legs respectively and adapted to be attached to a towing vehicle, cross braces, each having one end thereof pivotally and non-slidably interconnected with a leg member and having the opposite end thereof pivotally and slidably connected to the opposite leg member, whereby said legs may be spread apart to a position suitable for accommodating the landing gear of a given airplane, and binding means for fastening the slidable ends of said cross braces to said leg members to prevent further spreading movement thereof.

7. A tow bar for towing airplanes from a towing vehicle such as a tractor, comprising leg members pivotally interconnected with one another at one end thereof, means for connecting the opposite ends of said legs with the landing gear of an airplane, a hitch member interconnected with said legs respectively and adapted to be attached to a towing vehicle, cross braces, each having one end thereof pivotally interconnected with a leg member and having the opposite end thereof pivotally and slidably connected to the opposite leg member, whereby said legs may be spread apart to a position suitable for accommodating the landing gear of a given airplane, and means for fastening the slidable ends of said cross braces to said leg members to prevent further spreading movement thereof, said means comprising unidirectional clutch devices interposed between said cross braces and said legs.

8. A tow bar comprising leg members, a hitch member adapted to be connected with a towing vehicle, means extending laterally from said leg members into pivotal connection with said hitch member whereby said legs will be spaced apart from one another when they are arranged in substantially parallel relationship, clutch devices slidably carried by said legs, means carried by said clutch devices for preventing slidable movement thereof along said legs in a given direction without restraining movement thereof in an opposite direction, cross braces each having one end thereof pivotally connected to a leg and the opposite end thereof pivotally connected to a clutch device located at the opposite leg, said cross braces overlying one another and being arranged to occupy the space between the legs when the legs are arranged in substantially parallel relationship.

9. A tow bar comprising a hitch member adapted for attachment to a towing vehicle, leg members pivotally connected to said hitch member at one end thereof, means at the opposite ends of said leg members for effecting connection thereof with the landing gear of an airplane, clutch devices comprising members embracing said legs and slidable thereon, pressure rollers arranged for engagement with said legs, means presenting cam surfaces for urging said pressure rollers into pressure connection with said legs as said rollers are tracked upon said legs in one direction of movement of said clutch devices on said legs and for relieving said pressure rollers from pressure engagement with said legs through sliding movement in an opposite direction, and cross braces each having one end thereof pivotally connected with a leg and an opposite end thereof pivotally connected with the clutch devices on the opposite leg.

10. A tow bar comprising a hitch member adapted for attachment to a towing vehicle, leg members pivotally connected with one another at said hitch member whereby said legs may be arranged in diverging relationship, means at the opposite ends of said legs for effecting connection thereof with the landing gear of an airplane and casters mounted respectively at the latter ends of said legs, and providing the means whereby said tow bar unit may be rolled into position, said caster means being arranged in cambered position whereby the legs are caused through said cambering to move toward one another when the tow bar unit is being towed and, conversely, to be spread apart from one another when the tow bar unit is being pushed in a backward direction.

BENJAMIN PHILLIPS.